United States Patent
Liu et al.

(10) Patent No.: US 11,840,257 B2
(45) Date of Patent: Dec. 12, 2023

(54) LANE CHANGE DETERMINATION FOR VEHICLE ON SHOULDER

(71) Applicant: EMBARK TRUCKS INC., San Francisco, CA (US)

(72) Inventors: Mark Liu, San Francisco, CA (US); Roya Sabbagh Novin, San Francisco, CA (US)

(73) Assignee: Embark Trucks Inc., San Francisco, CA (US)

( * ) Notice: Subject to any disclaimer, the term of this patent is extended or adjusted under 35 U.S.C. 154(b) by 0 days.

(21) Appl. No.: 17/704,172

(22) Filed: Mar. 25, 2022

(65) Prior Publication Data

US 2023/0303119 A1 Sep. 28, 2023

(51) Int. Cl.
*B60W 60/00* (2020.01)
*B60W 30/18* (2012.01)

(52) U.S. Cl.
CPC .. *B60W 60/0015* (2020.02); *B60W 30/18163* (2013.01); *B60W 2552/10* (2020.02); *B60W 2554/801* (2020.02); *B60W 2555/60* (2020.02); *B60W 2720/106* (2013.01)

(58) Field of Classification Search
None
See application file for complete search history.

(56) References Cited

U.S. PATENT DOCUMENTS

| | | | | |
|---|---|---|---|---|
| 8,436,902 B2 * | 5/2013 | Kuehnle | ................. | G01W 1/14 348/148 |
| 8,665,079 B2 * | 3/2014 | Pawlicki | ............... | B60W 30/12 340/436 |
| 8,861,791 B2 * | 10/2014 | You | ...................... | G06V 20/588 382/104 |
| 9,352,777 B2 * | 5/2016 | Lavoie | ................... | H04N 7/183 |
| 9,506,774 B2 * | 11/2016 | Shutko | ................... | B60W 30/06 |
| 9,536,155 B2 * | 1/2017 | Takemae | ................. | E01F 11/00 |
| 9,981,662 B2 * | 5/2018 | Lavoie | ................... | B60W 10/06 |
| 10,345,822 B1 * | 7/2019 | Parchami | ............. | G05D 1/0251 |
| 11,024,051 B2 * | 6/2021 | Gomezcaballero | ....... | G06T 7/73 |
| 11,034,364 B1 * | 6/2021 | Narang | ................ | G08G 1/0112 |
| 11,541,910 B1 * | 1/2023 | Ganguli | .......... | B60W 30/18163 |

(Continued)

OTHER PUBLICATIONS

International Search Report and Written Opinion dated Mar. 30, 2023 which was issue in connection with PCT Application No. PCT/US23/13929.

*Primary Examiner* — Jonathan M Dager
(74) *Attorney, Agent, or Firm* — Buckley, Maschoff & Talwalkar LLC

(57) ABSTRACT

Provided is a system and method that can control a speed of an autonomous vehicle when approaching a vehicle on a shoulder based on a piecewise linear function. Further, the system and method may determine whether to perform a lane change based on various factors. In one example, the method may include storing a piecewise linear function, detecting a vehicle on a shoulder (VOS) of a road based on sensor data sensed by one or more sensors of an ego vehicle approaching the VOS, determining that the VOS is within a predefined distance of the ego vehicle, and in response to the determination, controlling the ego vehicle to slow down and then speed up based on the piecewise linear function.

20 Claims, 10 Drawing Sheets

(56) References Cited

U.S. PATENT DOCUMENTS

| | | | |
|---|---|---|---|
| 2006/0132295 A1* | 6/2006 | Gern | B60Q 9/008 340/438 |
| 2011/0184605 A1* | 7/2011 | Neff | G05D 1/0285 701/25 |
| 2012/0101713 A1* | 4/2012 | Moshchuk | B60W 40/064 701/301 |
| 2012/0288154 A1* | 11/2012 | Shima | G06T 7/174 382/103 |
| 2013/0151058 A1* | 6/2013 | Zagorski | G05D 1/0289 701/1 |
| 2014/0032049 A1* | 1/2014 | Moshchuk | G08G 1/166 701/42 |
| 2016/0339880 A1* | 11/2016 | Svensson | B60W 30/09 |
| 2017/0291603 A1* | 10/2017 | Nakamura | B60W 30/18163 |
| 2017/0329332 A1* | 11/2017 | Pilarski | B60W 30/095 |
| 2018/0233034 A1* | 8/2018 | Tachibana | G08G 1/052 |
| 2019/0135291 A1* | 5/2019 | Sim | B60W 10/188 |
| 2019/0202451 A1* | 7/2019 | Hayamizu | B60W 50/14 |
| 2019/0213290 A1* | 7/2019 | Delva | G01M 17/007 |
| 2019/0217703 A1* | 7/2019 | Uejima | G08G 1/167 |
| 2019/0276013 A1* | 9/2019 | Kim | G06V 20/588 |
| 2019/0291730 A1* | 9/2019 | Kamiya | G06V 20/58 |
| 2019/0294170 A1* | 9/2019 | Kazemi | G05D 1/0274 |
| 2019/0369626 A1* | 12/2019 | Lui | G05D 1/0221 |
| 2020/0062245 A1* | 2/2020 | Samotsvet | G06T 7/60 |
| 2020/0064855 A1* | 2/2020 | Ji | G05D 1/0214 |
| 2020/0066147 A1* | 2/2020 | Vadillo | G05D 1/0088 |
| 2020/0150652 A1* | 5/2020 | Urano | B60W 50/082 |
| 2020/0198649 A1* | 6/2020 | Emura | G05B 13/0265 |
| 2020/0223437 A1* | 7/2020 | Satou | B60R 21/00 |
| 2020/0249684 A1* | 8/2020 | Onofrio | G05D 1/0219 |
| 2020/0257299 A1* | 8/2020 | Wang | G08G 1/167 |
| 2020/0355823 A1* | 11/2020 | Tingley | G01S 13/865 |
| 2021/0046936 A1* | 2/2021 | Umeda | B60W 10/20 |
| 2021/0061270 A1* | 3/2021 | Parks | B60W 10/18 |
| 2021/0094539 A1* | 4/2021 | Beller | G05D 1/0221 |
| 2021/0094575 A1* | 4/2021 | Sato | B60W 10/20 |
| 2021/0107567 A1* | 4/2021 | Varunjikar | G01S 13/931 |
| 2021/0129835 A1* | 5/2021 | Viehmann | B62D 15/0265 |
| 2021/0129865 A1* | 5/2021 | Jeong | B60W 50/14 |
| 2021/0190536 A1* | 6/2021 | Gil Casals | G01C 21/3841 |
| 2021/0206389 A1* | 7/2021 | Kim | G01C 21/3415 |
| 2021/0237739 A1* | 8/2021 | Hayakawa | B60W 60/001 |
| 2021/0253128 A1* | 8/2021 | Nister | G06N 7/01 |
| 2021/0276588 A1* | 9/2021 | Kabzan | B60W 10/20 |
| 2021/0300419 A1* | 9/2021 | Matsunaga | G06V 20/56 |
| 2021/0300420 A1* | 9/2021 | Matsunaga | B60W 60/0059 |
| 2021/0309217 A1* | 10/2021 | Kim | G08G 1/165 |
| 2021/0309227 A1* | 10/2021 | Jang | B60W 40/04 |
| 2022/0009522 A1* | 1/2022 | Zhang | B62D 15/025 |
| 2022/0017079 A1* | 1/2022 | Kakeshita | B60W 10/20 |
| 2022/0017080 A1* | 1/2022 | Moriya | B60W 30/09 |
| 2022/0017081 A1* | 1/2022 | Yokoyama | G06V 10/273 |
| 2022/0048499 A1* | 2/2022 | Yang | B60W 10/18 |
| 2022/0063664 A1* | 3/2022 | Liu | G08G 1/09626 |
| 2022/0063669 A1* | 3/2022 | Fukushige | B60W 40/105 |
| 2022/0073095 A1* | 3/2022 | Seitz | B60K 35/00 |
| 2022/0080977 A1* | 3/2022 | Ucar | B60W 40/09 |
| 2022/0089186 A1* | 3/2022 | Gotou | B60W 10/20 |
| 2022/0105931 A1* | 4/2022 | Motegi | G06V 20/588 |
| 2023/0140569 A1* | 5/2023 | Foster | G01C 21/3815 701/400 |

* cited by examiner

LANE CHANGE DETERMINATION FOR VEHICLE ON SHOULDER

BACKGROUND

Autonomous vehicles have safety systems in place to prevent the vehicles from running into other vehicles or objects in the road. However, other issues can present themselves to an autonomous vehicle. One such issue is a vehicle on the shoulder. These vehicles are not in the same lane as the autonomous vehicle, but they can still present problems, for example, people opening doors, people running out, the vehicle moving back onto the road, etc. These issues can cause an accident for the autonomous vehicle. Furthermore, when the vehicle is a larger autonomous vehicle such as a semi-truck or trailer, a vehicle on the road can be even more dangerous due to the reduced lateral clearance of such a larger vehicle.

SUMMARY

The example embodiments are directed to a process for controlling a vehicle, such as an autonomous or a semi-autonomous vehicle, while the vehicle is moving along a lane of a road and another vehicle is located (and approaching) on a shoulder of the road. In some embodiments, the vehicle being controlled may be referred to as an ego vehicle that has sensors capable of automatically sensing and interpreting the environment and the conditions around the ego vehicle as it moves. The ego vehicle may be embodied with a novel speed limiter function that is activated when a vehicle on the shoulder (VOS) is detected. The speed limiter function may be a piecewise linear function that is used by the ego vehicle to slow a speed of the ego vehicle prior to approaching the VOS and increase the speed of the ego vehicle after the ego vehicle has successfully passed the VOS.

In particular, the speed limiting function may include a first linear change of speed that is performed before the ego vehicle is adjacent or parallel to the VOS. The limiting may drop the ego vehicle's speed to a predefined minimum allowed speed which may be set in advance or dynamically determined. The ego vehicle may maintain this speed until shortly after it passes by the VOS. Then, the ego vehicle may rapidly increase its speed (e.g., faster than the rate at which it slowed down, etc.) to resume its initial speed before dropping down or to resume a different desired speed.

In addition, and possibly simultaneously with the speed limiting, the ego vehicle may also determine whether or not to perform a lane change as a result of the vehicle on the shoulder. For example, the ego vehicle may determine whether or not to move over to an adjacent lane based on multiple factors associated with the vehicle on the shoulder (VOS), other vehicles on the road, lane preferences, speed limits, end-of-route, and the like. For example, the ego vehicle may execute an optimization algorithm that determines whether to move the ego vehicle to an adjacent lane (i.e., perform a lane change) based on a sensed longitudinal distance from the ego vehicle to the VOS and a sensed lateral distance from the VOS to a lane in which the ego vehicle is travelling.

According to an aspect of an example embodiment, provided is an apparatus that may include a memory to store a piece-wise linear function, and a processor to detect a vehicle on a shoulder (VOS) of a road based on sensor data sensed by one or more sensors of an ego vehicle approaching the VOS, determine that the VOS is within a predefined distance of the ego vehicle, and in response to the determination, control the ego vehicle to slow down and then speed up based on the piece-wise linear function.

According to an aspect of another example embodiment, provided is a method that may include storing a piece-wise linear function, detecting a vehicle on a shoulder (VOS) of a road based on sensor data sensed by one or more sensors of an ego vehicle approaching the VOS, determining that the VOS is within a predefined distance of the ego vehicle, and in response to the determination, controlling the ego vehicle to slow down and then speed up based on the piece-wise linear function.

According to an aspect of another example embodiment, provided is a non-transitory computer-readable medium with instructions which when executed by a processor cause a computer to perform a method that may include storing a piece-wise linear function, detecting a vehicle on a shoulder (VOS) of a road based on sensor data sensed by one or more sensors of an ego vehicle approaching the VOS, determining that the VOS is within a predefined distance of the ego vehicle, and in response to the determination, controlling the ego vehicle to slow down and then speed up based on the piece-wise linear function.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
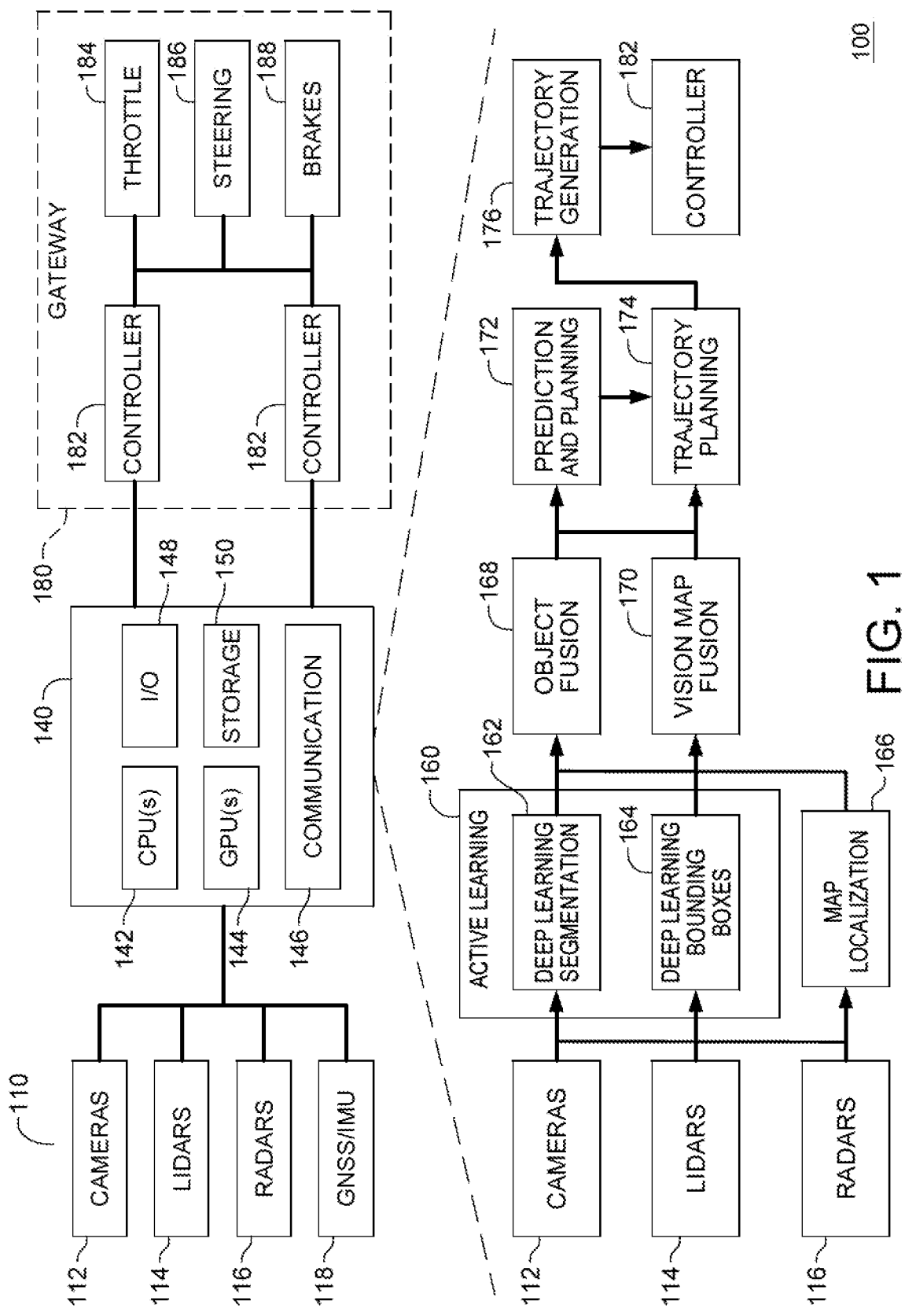
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data.

In many vehicles, the perception of the vehicle is created based on a combination (i.e., jointly) of lidar data from the lidar sensors and image data captured by the cameras. For accurate perception, these two systems must be aligned with respect to each other. Calibration can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

With the calibrated sensors, the vehicle can capture images and lidar readings of the area surrounding the vehicle and build/modify a three-dimensional map that is stored internally within a computer of the vehicle (or remotely via a web server). The vehicle can localize itself within the map and make decisions on how to steer, turn, slow down, etc. based on other objects, lane lines, entrance lanes, exit lanes, etc. within the map. Autonomous vehicles may use one or more computer systems to control the vehicle to move autonomously without user input. For example, the vehicle may be equipped with an autonomous vehicle (AV) system that generates signals for controlling the engine, the steering wheel, the brakes, and the like, based on other objects, lane lines, entrance lanes, and exit lanes, within the map.

In the example embodiments, a vehicle travelling down the road (referred to herein as an "ego" vehicle) may detect another vehicle that is located on a shoulder of the road. As the ego vehicle approaches the vehicle on the shoulder, the ego vehicle may execute a piecewise linear function to control a slow-down process of the ego vehicle followed by a speed-up process of the ego vehicle. For example, the ego vehicle may slow down to a predefined minimum speed prior to reaching the vehicle on the shoulder, hold that minimum speed until after a predetermined distance after the vehicle on the shoulder, and then speed up until a desired speed limit is achieved. Thus, the predetermined minimum speed may be held while the ego vehicle passes the vehicle on the shoulder to ensure safe passage. After the ego vehicle passes the vehicle on the shoulder, the ego vehicle may return (speed-up) to is previous speed or any desired speed.

In addition to the slow down process, the ego vehicle may also determine whether to perform a lane change. This process may be performed simultaneously with the slow-down process. For example, if the ego vehicle is travelling in the far-right lane and the shoulder is to the right of the far-right lane, the ego vehicle may perform a lane change to an opposite side (i.e., a next lane with respect to a current lane of the ego vehicle which is further removed from the shoulder). Here, the ego vehicle may evaluate the lateral distance between the vehicle on the shoulder and the current lane of the ego vehicle (e.g., a fog line of the far-right lane, a center of the lane, etc.). In addition, the ego vehicle may evaluate various cost factors based on attributes such as speed limit, lane preference, end of route, impatience, and the like.

In some of the examples herein, the vehicle is illustrated as a semi-truck. However, it should be appreciated that the example embodiments are applicable to any kind of autonomous vehicle and not just trucks or semi-trucks but instead may include cars, boats, tractors, motorcycles, and the like, as well as trucks of all kinds. Furthermore, in the examples herein, terms like "minimum", "maximum", "safe", "conservative", and the like, may be used. These terms should not be construed as limiting any type of distance or speed in any way.

Figure 2A:
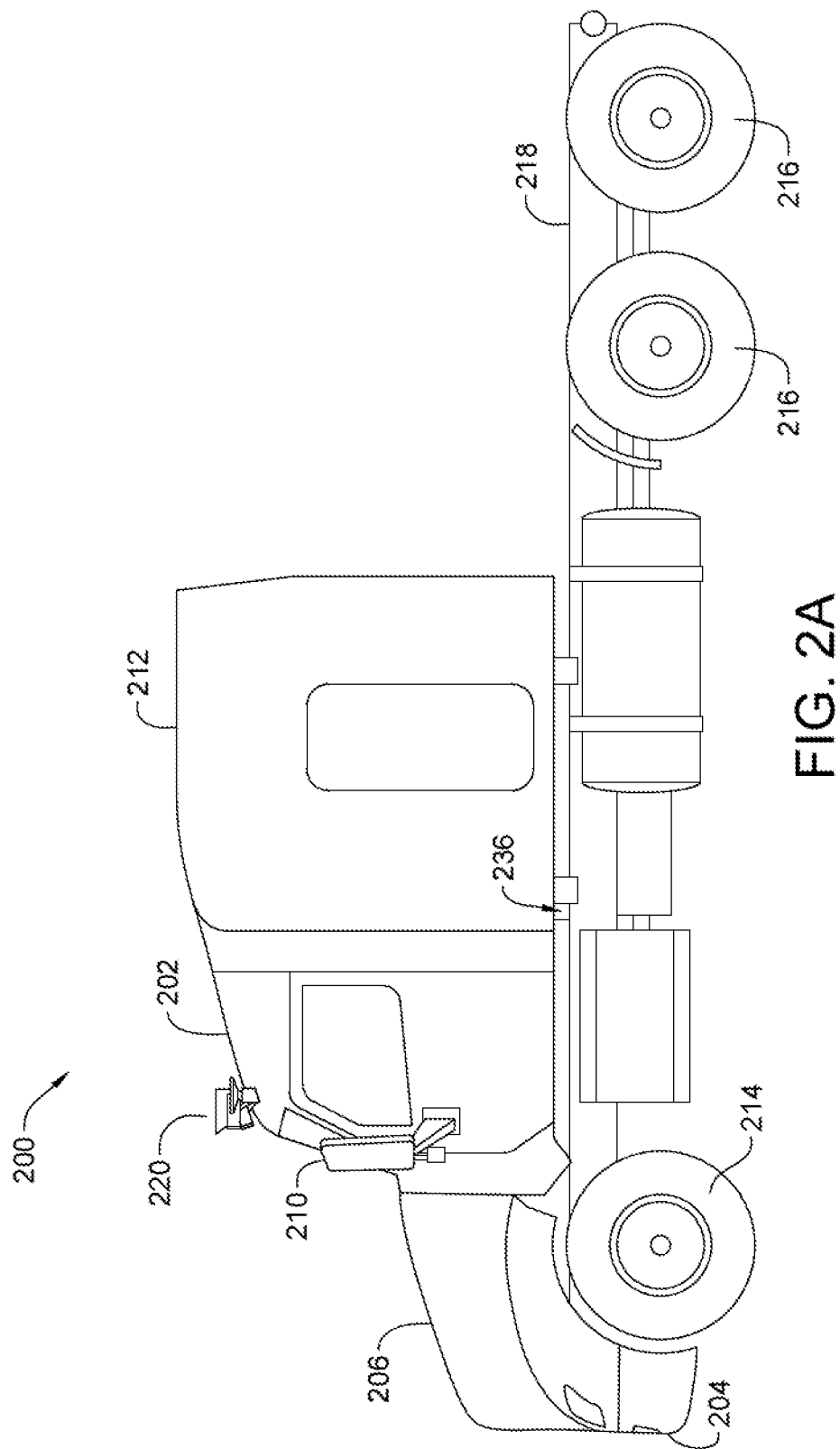
FIGS. 2A-2C are diagrams illustrating exterior views of a semi-truck that may be used in accordance with example embodiments.
Figure 2B:
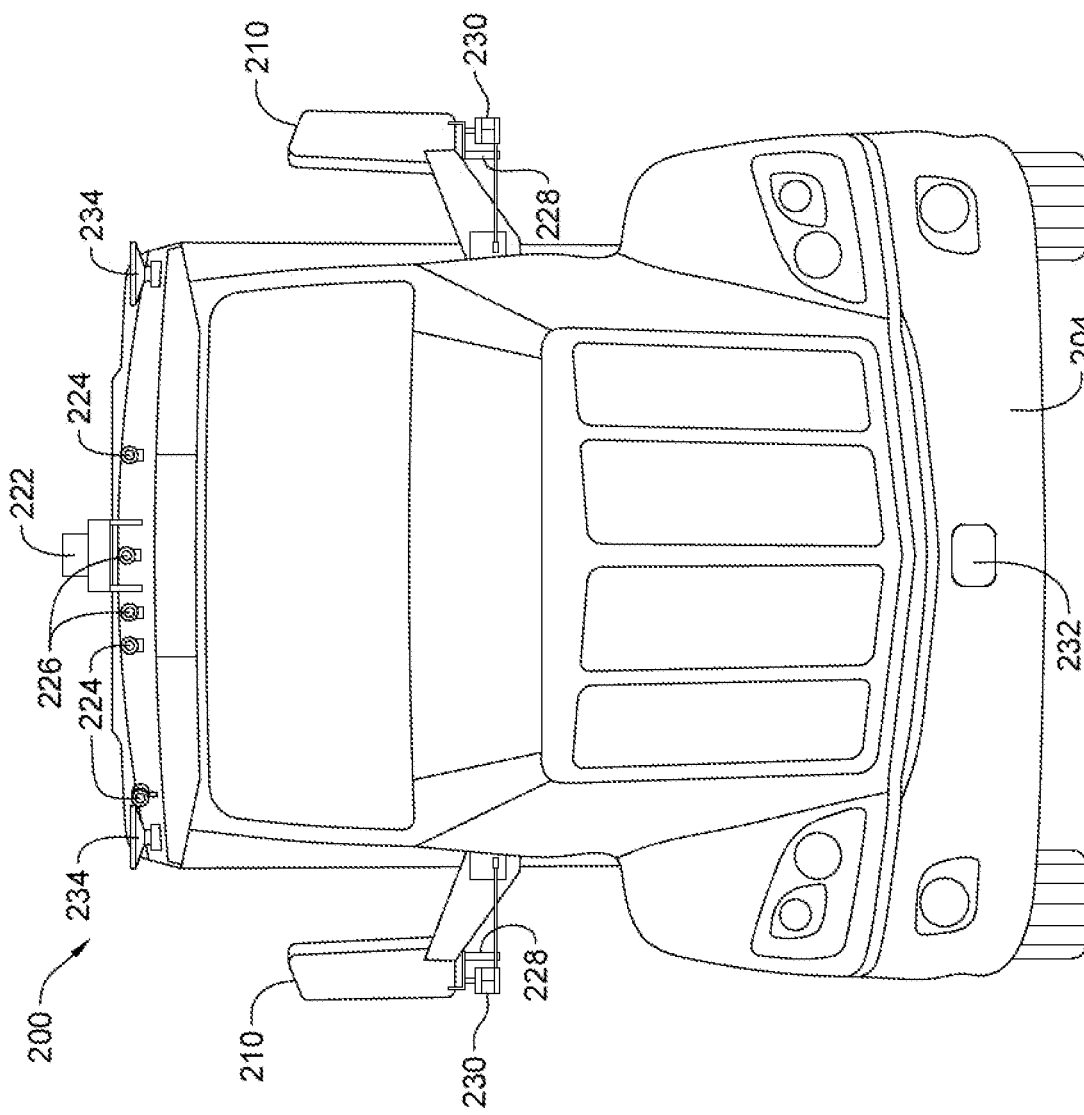
Figure 2C:
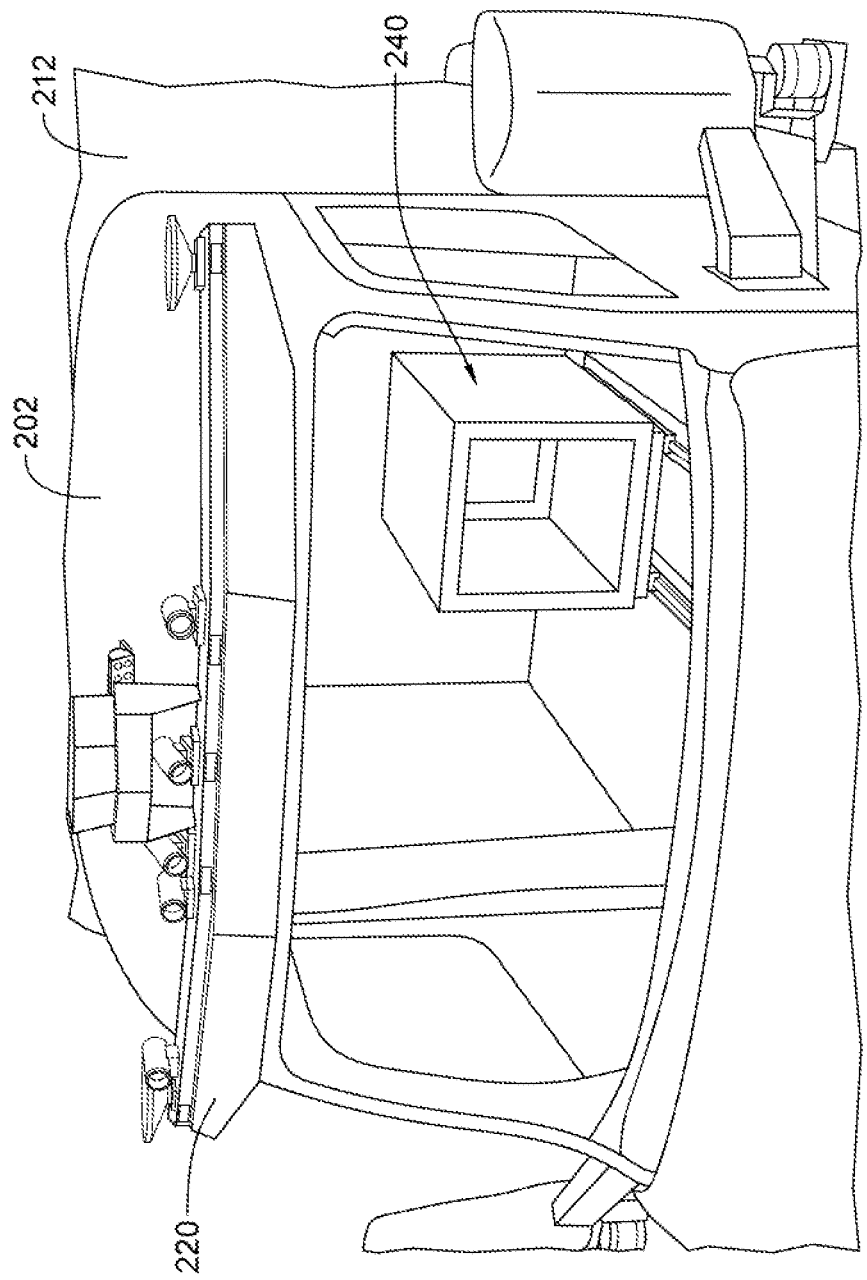

FIG. 1 illustrates a control system 100 that may be deployed in a vehicle such as the semi-truck 200 depicted in FIGS. 2A-2C, in accordance with an example embodiment. In some embodiments, the vehicle may be referred to as an ego vehicle. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 200 in an autonomous (or semi-autonomous) mode of operation.

In operation, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 sensors may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server. Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

In the examples further described herein, the control system 100 in the example of FIG. 1 may be embodied within an ego vehicle such as the semi-truck 200 shown and described with respect to FIGS. 2A-2C. In these examples, the ego vehicle can use the sensors and other systems of the vehicle to detect the presence of another vehicle on a shoulder of a road while the ego vehicle is traveling along the road and approaching the ego vehicle. The ego vehicle may use a piecewise linear function to change speeds in short segments rather than using a constant change of speed. Furthermore, the ego vehicle may determine whether or not to perform a lane change (e.g., to a lane on an opposite side of the ego vehicle and which is further removed from the shoulder than the current lane of the ego vehicle, etc.) Whether such a lane change is made may be a dynamic decision made by the ego vehicle's computer as the ego vehicle is approaching the vehicle on the shoulder.

Figure 3A:
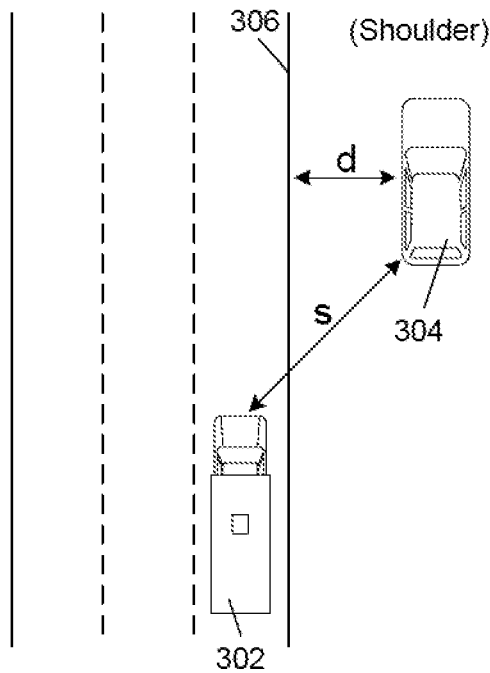
FIGS. 3A-3D are diagrams illustrating possible scenarios for an ego vehicle approaching a vehicle on the shoulder (VOS) in accordance with example embodiments.

FIGS. 3A-3D illustrate examples of possible scenarios for an ego vehicle approaching a vehicle on the shoulder (VOS) in accordance with an example embodiment. FIG. 3A illustrates a scenario in which an ego vehicle 302 is approaching a vehicle on a shoulder (VOS) 304. In this example, the ego vehicle 302 may sense a longitudinal distance (s) between the ego vehicle 302 and the VOS 304 and a lateral distance (m) between the VOS 304 and a current lane of the ego vehicle 302, for example, the fog line 306 of the current lane of the ego vehicle 302.

In the example of FIG. 3A, the ego vehicle 302 is travelling in a far-right lane and the shoulder is to the right of the far-right lane. Meanwhile, two other lanes are disposed to the left of the current lane of the ego vehicle 302. In his example, the ego vehicle 302 may be configured such that if the ego vehicle 302 detects that the lateral distance m between the VOS 304 and the current lane of the ego vehicle 302 is above a predefined threshold (e.g., 5 feet, 8 feet, 10 feet, etc.) the ego vehicle 302 may perform a speed limiting function as further described in the examples of FIGS. 4A-4B and control itself to stay in the current lane.

Figure 3B:
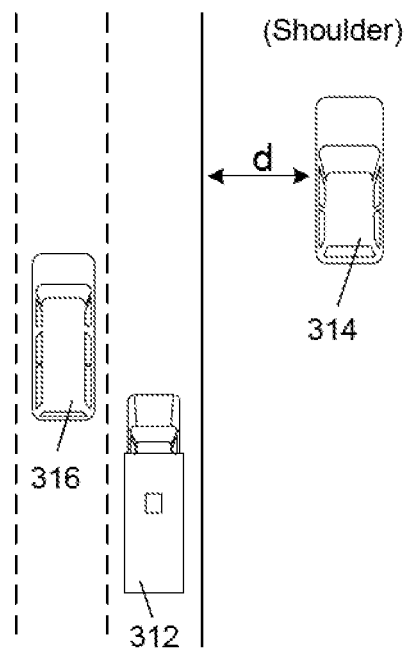

FIG. 3B illustrates a second scenario in which an ego vehicle 312 is approaching a vehicle on a shoulder (VOS) 314. In this example, the ego vehicle 312 is travelling in the far-right lane and there is another vehicle 316 (i.e., vehicle traffic) positioned in the lane to the immediate left of the current lane of the ego vehicle 312. That is, the other vehicle 316 is in a lane that is on the opposite side of the ego vehicle 312 and further removed from the shoulder where the VOS 314 is located than the current lane of the ego vehicle 312. In this example, the ego vehicle 312 may detect that a lateral distance m between the VOS 314 and a current lane of the ego vehicle 312 and compare it to a predefined threshold. If m is above the predefined threshold, the ego vehicle 312 may perform the speed limiting function and control itself to stay in its current lane regardless of the location of the other vehicle 316.

Figure 3C:
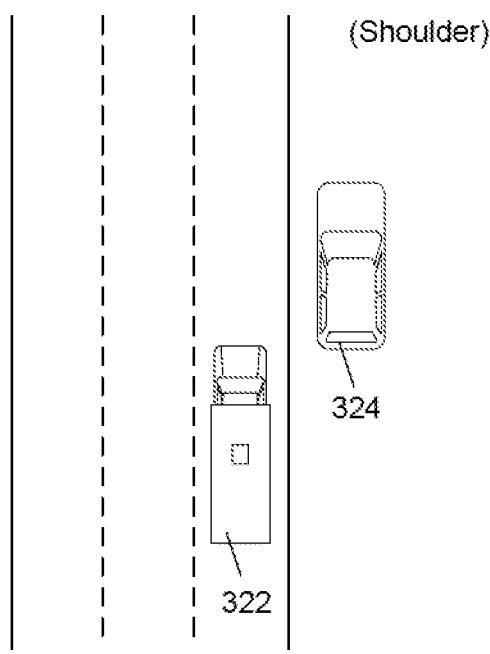

FIG. 3C illustrates a third scenario in which an ego vehicle 322 is approaching a vehicle on a shoulder (VOS) 324. In this example, the ego vehicle 322 may sense a longitudinal distance s between the ego vehicle 322 and the VOS 324 and a lateral distance between the VOS 324 and a current lane of the ego vehicle 322. In this example, the lateral distance between the VOS 324 and the current lane of the ego vehicle 322 is below the predefined threshold. Furthermore, no other vehicles are present in the adjacent lane that is further removed from the shoulder. Therefore, the ego vehicle 322 may be configured to perform a lane change in addition to the speed limiting function. In some embodiments, the ego vehicle 322 may simultaneously perform the lane change and reduce speed based on the piecewise linear function.

Figure 3D:
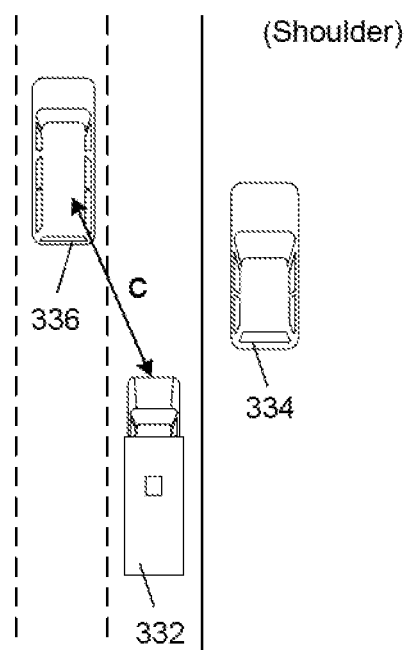

FIG. 3D illustrates a further scenario in which an ego vehicle 332 is approaching a vehicle on a shoulder (VOS) 334. In this example, the ego vehicle 332 is travelling in the far-right lane and there is an additional vehicle 336 (i.e., vehicle traffic) positioned in the lane to the immediate left of the current lane of the ego vehicle 332. That is, the additional vehicle 336 is in a lane that is on the opposite side of the ego vehicle 332 with respect to the shoulder where the VOS 314 is located and that is further removed from the shoulder than the current lane of the ego vehicle 332. In this example, the ego vehicle 332 may detect that the lateral distance m between the VOS 334 and a current lane of the ego vehicle 332 is below the predefined threshold. However, in this example, the ego vehicle 332 detects the additional vehicle 336 which is present in the adjacent lane (i.e., the lane to the immediate left of the current lane of the ego vehicle 332). In this example, the ego vehicle 332 may choose whether to stay in the current lane or perform a lane change. For example, a distance (1) between the ego vehicle 332 and the additional vehicle 336 may be used to determine whether or not to perform a lane change.

In some embodiments, the decision on whether to make a lane change may also be influenced by various cost functions. For example, in the third scenario described with respect to FIG. 3C and/or the fourth scenario described with respect to FIG. 3D, the ego vehicle may also determine whether a lane change is performed by analyzing one or more cost functions such a lane preference cost function, a speed limit cost function, an end of route cost function, an impatience cost function, and the like. Here, the ego vehicle may include an algorithm that identifies tradeoffs that are allowed between different cost functions thus allowing the ego vehicle to make determinations based on the cost functions. In some cases, one or more cost functions may be given more weight than the others.

Figure 4A:
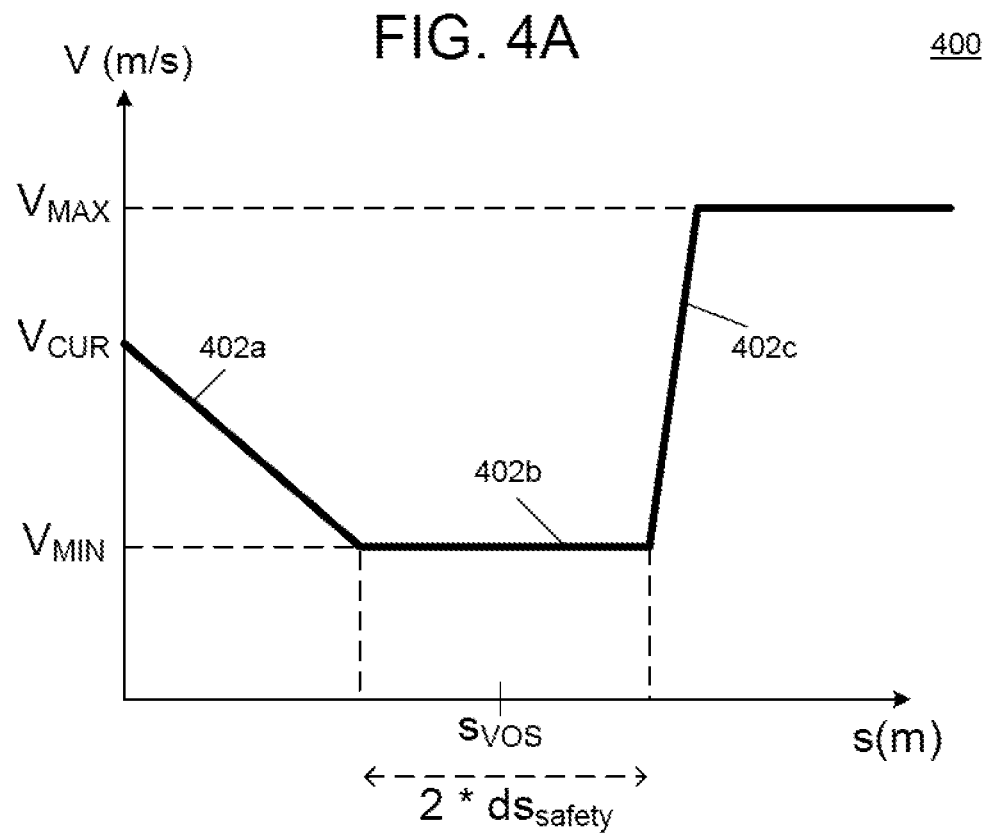
FIGS. 4A-4B are diagrams illustrating examples of speed limiting functions for an ego vehicle in response to detecting a vehicle on the shoulder in accordance with example embodiments.
Figure 4B:
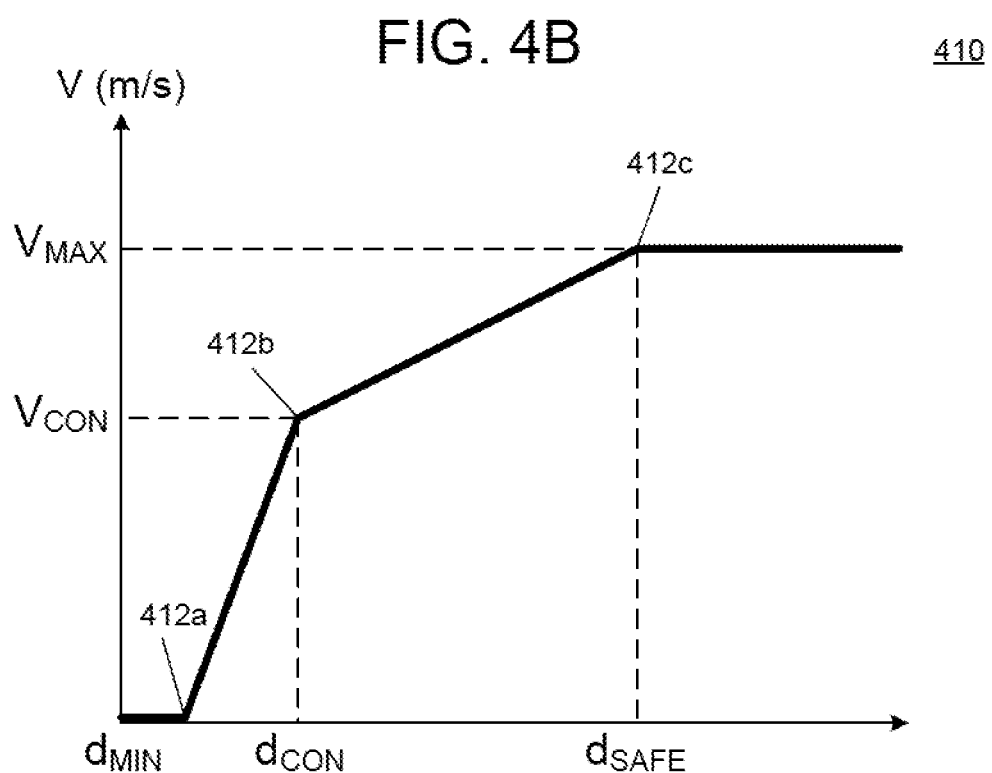

FIGS. 4A-4B illustrate examples of speed limiting functions for an ego vehicle in response to detecting a vehicle on the shoulder in accordance with an example embodiment. Here, FIG. 4A illustrates a speed profile for an ego vehicle based on a longitudinal distance (s) from the ego vehicle to the VOS, and FIG. 4B illustrates a minimum speed profile that can be used to conservatively set the ego vehicle at a safe speed while the ego vehicle is travelling alongside (adjacent to) the vehicle on the shoulder.

Referring to FIG. 4A, a speed profile 400 includes a piecewise linear representation including three sections of speed 402a, 402b, and 402c, that are performed in sequence when an ego vehicle is passing a vehicle on the shoulder. In this example, the y axis of the speed profile 400 represents a speed or velocity of the ego vehicle and the x axis of the speed profile 400 represents a longitudinal distance between the ego vehicle and the vehicle on the shoulder of the road.

In some embodiments, the ego vehicle may slow the speed of the vehicle according to the first section 402a of the speed profile 400, maintain the slowed speed for a predetermined distance according to the second section 402b of the speed profile 400, and speed up the vehicle according to the third section 402c. Each change in the speed profile 400 may correspond to a different longitudinal distance thresholds being reached between the ego vehicle and the VOS.

For example, the first section 402a of the speed profile 400 may cause the ego vehicle to decrease its rate of speed when it detects the VOS within a predetermined distance from the ego vehicle (e.g., 1500 meters, 1000 meters, 750 meters, etc.) For example, when the ego vehicle is 1000 meters away from the VOS it may begin controlling the speed of the ego vehicle to slow down, decelerate, apply a brake, etc. to achieve a predefined minimum speed according to the speed profile 400. Here, the ego vehicle may follow the first section 402a of the speed profile 400 until the ego vehicle reaches a predefined minimum speed ($V_{MIN}$) that may be set in advance or determined dynamically based on the minimum speed profile 410 shown in FIG. 4B.

Once the ego vehicle reaches the predefined minimum speed $V_{MIN}$ (e.g., 10 mph, 15 mph, 25 mph, 35 mph, etc.) it may hold that predefined minimum speed until it has passed the vehicle on the shoulder (i.e., the second section 402b of the speed profile 400). For example, the ego vehicle may time it so that the ego vehicle reaches the predefined minimum speed $V_{MIN}$ at a safe distance longitudinally (prior) to the ego vehicle reaching the vehicle on the shoulder (e.g., 500 meters, 300 meters, 200 meters, etc.) Furthermore, the ego vehicle may hold the predefined minimum speed until it is a predetermined longitudinal distance (e.g., 15 meters, 30 meters, 50 meters, etc.) passed the vehicle on the shoulder and increase its speed until it reaches a desired traveling speed according to the third section 402c of the speed profile 410. For example, it could return to the previous travelling speed of the ego vehicle before the vehicle on the shoulder was detected or a different speed.

FIG. 4B illustrates a minimum speed profile 410 that may be used to identify a minimum speed ($V_{MIN}$) of the ego vehicle in a dynamic manner based on a lateral distance between the current lane of the ego vehicle and the vehicle parked on the shoulder. In this example, the predetermined minimum speed may differ based on a lateral distance between a current lane of the ego vehicle and the vehicle parked on the shoulder. Here, the lateral distance (s) may be measured from the edge of the current lane of the vehicle to a closest point on the vehicle on the shoulder (e.g., a body of the vehicle, a door, a tire, etc.) The distance may be measured along a straight line that is approximately parallel to the lane lines/fog lines in the road.

As shown in FIG. 4B, the ego vehicle may require a predetermined minimum distance represented by distance 412a (e.g., 0.2 m, 0.3 m, etc.) in the minimum speed profile 410. If the vehicle on the shoulder is closer than this distance 412a, the ego vehicle may be required to perform a lane change before passing the vehicle on the shoulder. If, however, the vehicle on the shoulder is at least a distance 412a but less than or equal to a conservative distance 412b (e.g., 0.65 meters, 0.75 meters, 1.0 meters, etc.) the ego vehicle may control itself to operate at a minimum speed as shown in the speed profile 410 of FIG. 4B. Furthermore, if the vehicle on the shoulder is at a greater lateral distance than the conservative distance 412b but less than a safe distance 412c from the current lane, the ego vehicle may control itself to go at an even faster minimum speed but not its maximum minimum speed. Furthermore, if the vehicle on the shoulder is at least the safe distance 412c away from the current lane of the ego vehicle, the ego vehicle may operate at its maximum minimum speed. The speed profile may be used with different miles per house (mph) and should not be construed as limiting to a particular mph. Here, the terms "safe" and "conservative" may refer to arbitrary limits that are predefined and encoded into rules that are executed by the ego vehicle's computer.

Figure 5A:
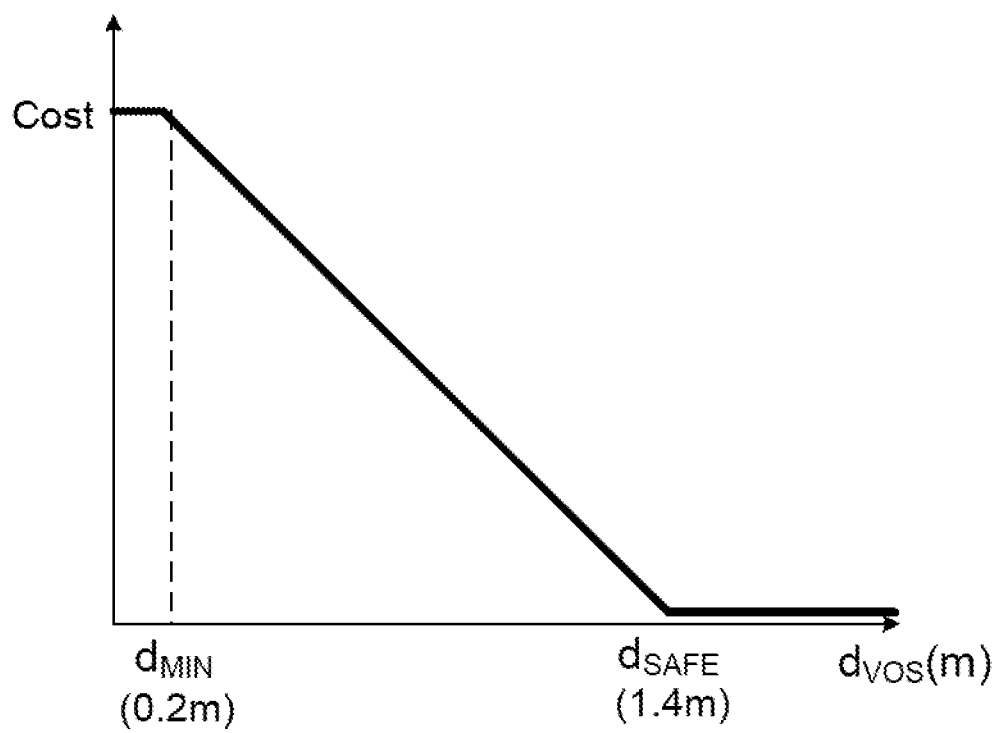
FIGS. 5A-5B are diagrams illustrating cost evaluation functions in accordance with example embodiments.
Figure 5B:
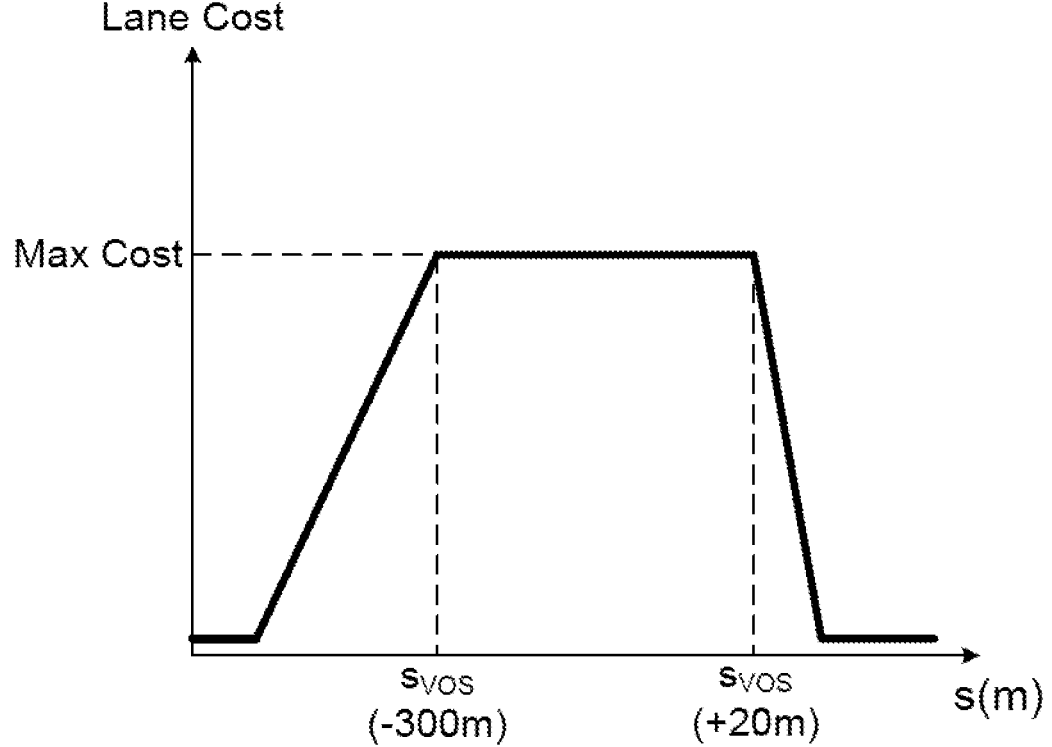

FIGS. 5A-5B illustrate cost evaluation functions in accordance with example embodiments. Referring to FIG. 5A, there is shown a cost function 500 for a lateral distance between a vehicle on the shoulder (VOS) and a current lane of an ego vehicle. Meanwhile, FIG. 5B illustrates a cost function 510 for longitudinal distance between the ego vehicle and the vehicle on the shoulder. Other cost functions may be considered including a lane preference cost function, an end-of-route cost function, a speed limit cost function, and an impatience cost function (due to a slow vehicle). The ego vehicle's computer may have installed therein an optimization program which can analyze the tradeoff between the different options from a cost perspective and decide which option creates the least amount of cost as a whole. For example, the lane change optimizer may attempt to find the best action which minimizes the overall cost. With the current implementation, this means that the closer the VOS is to the current lane of the ego vehicle (e.g., the fog line, etc.), the greater the cost of the VOS will be so it will attempt to perform a lane change more aggressively.

Figure 6A:
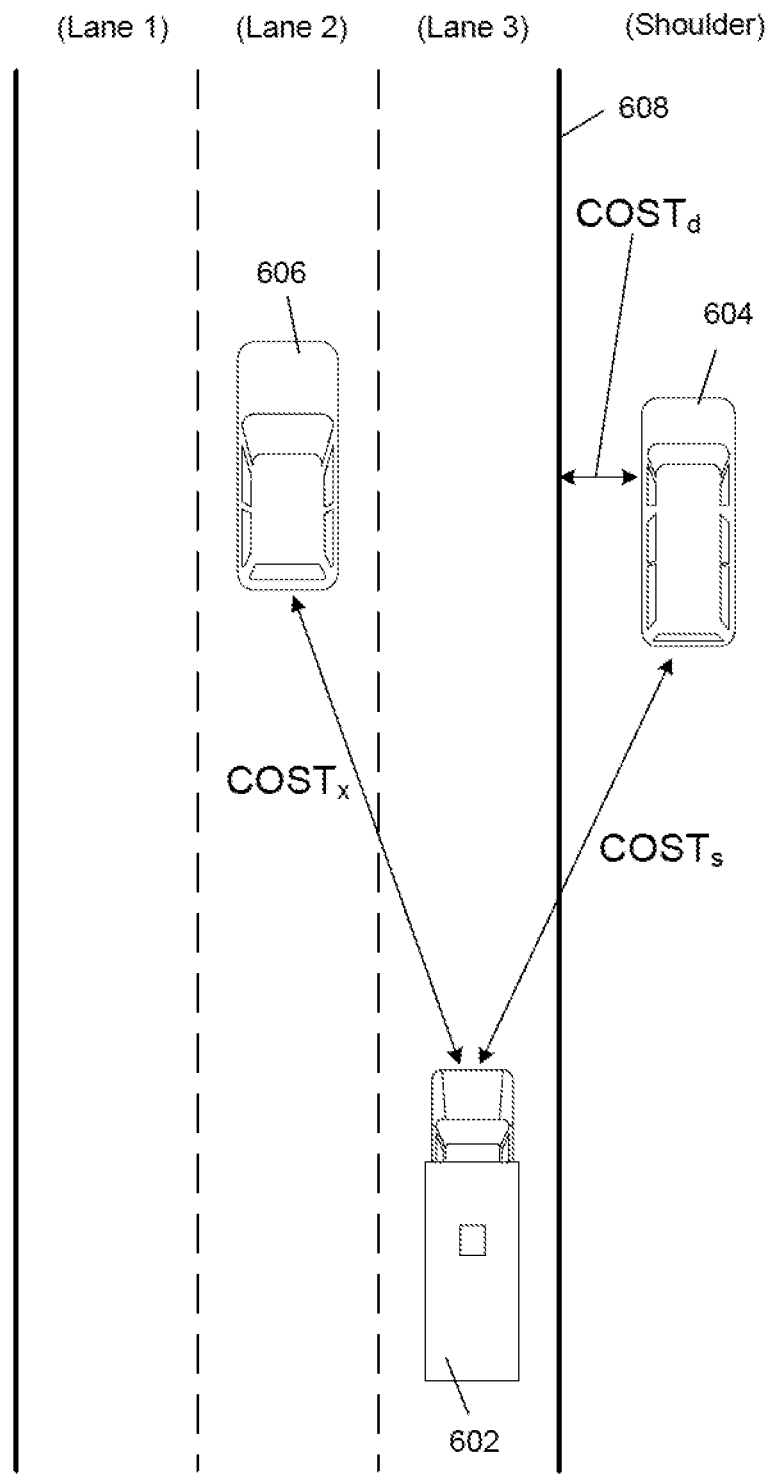
FIGS. 6A-6B are diagrams illustrating a process of performing a lane change in accordance with example embodiments.
Figure 6B:
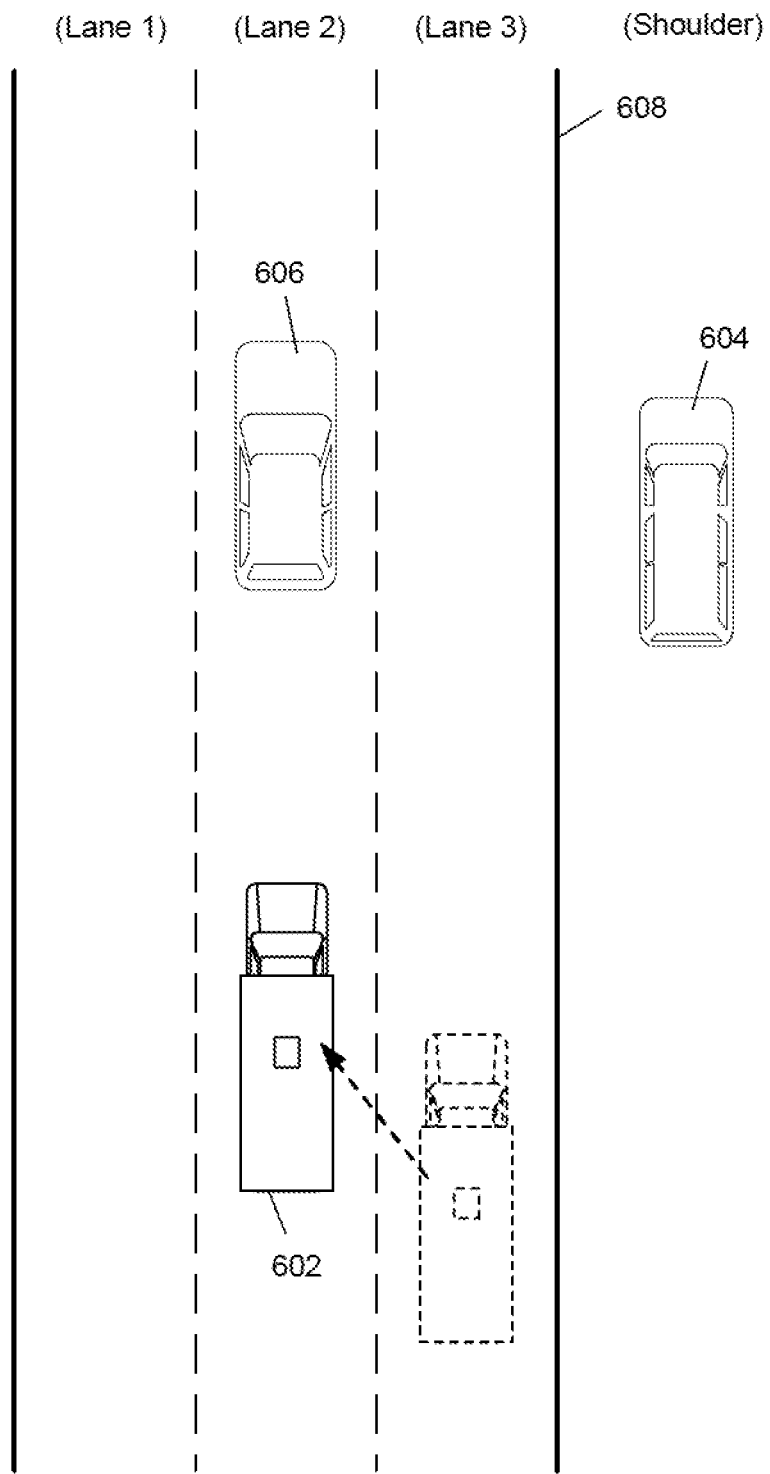

FIGS. 6A-6B illustrate a process of performing a lane change in accordance with example embodiments. In particular, FIG. 6A illustrates a process 600A of analyzing cost and FIG. 6B illustrates a process 600B of controlling an ego vehicle 602 to make a lane change. For example, in response to evaluating the cost functions 500 and 510 shown in FIGS. 5A and 5B, the ego vehicle 602 may decide to change lanes from a current lane in which it is travelling (i.e., lane 3 in FIG. 6A) to an adjacent lane (i.e., lane 2 in FIG. 6B) in response to detecting a vehicle on the road (VOS) 604.

Here, the VOS 604 is a distance (d) away from a fog line 608 of the current lane in which the ego vehicle 602 is travelling. In addition, an additional vehicle 606 is travelling in the adjacent lane (i.e., lane 2) with respect to the current lane of the ego vehicle 602. In this example, the ego vehicle 602 may analyze multiple costs such as the cost of changing lanes, the cost to the VOS 604, the cost to the additional vehicle 606, and the like, and make a decision on whether to change lanes based on the overall cost.

Figure 7:
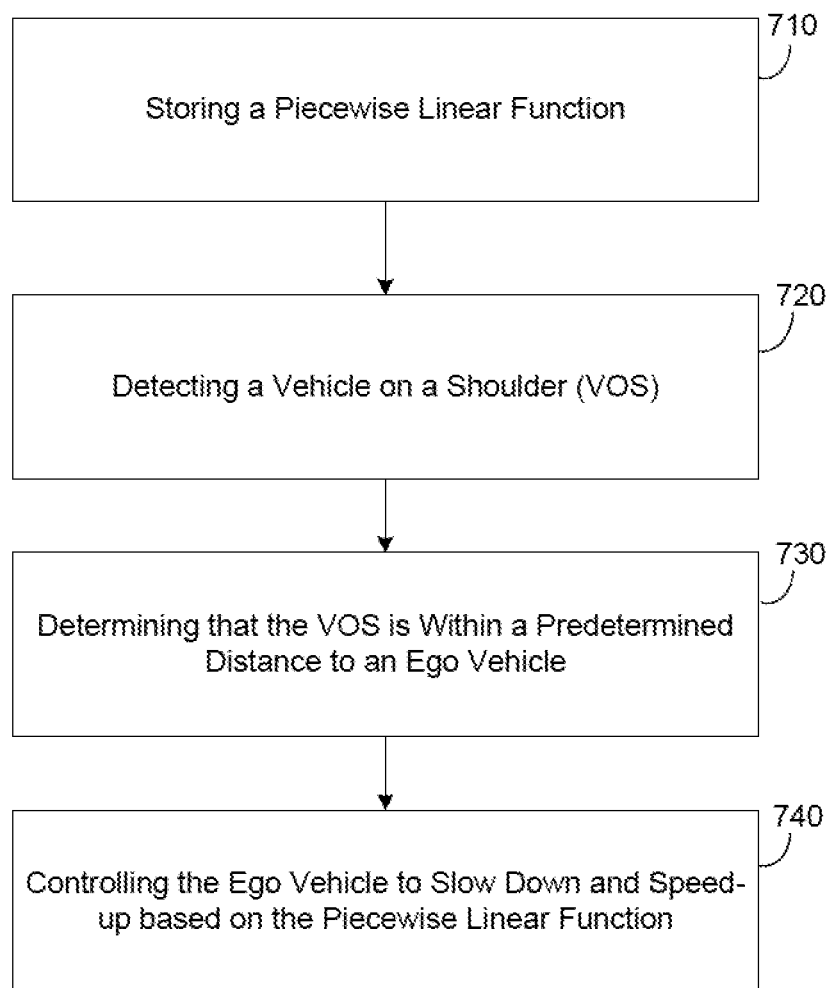
FIG. 7 is a diagram illustrating a method for handling a vehicle on the shoulder in accordance with an example embodiment.

FIG. 7 illustrates a method 700 for handling a vehicle on the shoulder in accordance with an example embodiment. As an example, the method 700 may be performed by a processor, computer, chip, apparatus, etc., that is on a vehicle such as an ego vehicle. Referring to FIG. 7, in 710, the method may include storing a piecewise linear function. An example of the piecewise linear function is described with respect to FIGS. 4A-4B.

In 720, the method may include detecting a vehicle on a shoulder (VOS) of a road based on sensor data sensed by one or more sensors of an ego vehicle approaching the VOS. Here, the ego vehicle may be travelling in a lane that is immediately adjacent to the shoulder of the road. In 730, the method may include determining that the VOS is within a predefined distance of the ego vehicle. As an example, the predefined distance may be 100 meters, 200 meters, 300 meters, or the like. The predefined distance may also be based on the speed at which the vehicle is currently travelling. In response to the determination in 730, the method may further include controlling the ego vehicle to slow down and then speed up based on the piecewise linear function in 740.

In some embodiments, the controlling may include controlling the ego vehicle to slow down to a predefined minimum speed at a predetermined distance before the ego vehicle is adjacent to the VOS. In some embodiments, the controlling may include holding the ego vehicle at the predefined minimum speed until a predetermined distance after the ego vehicle has passed the VOS, and controlling the ego vehicle to speed-up to a predefined maximum speed. In some embodiments, the method may further include determining whether to perform a lane change to a lane further removed from the shoulder based on one or more of a longitudinal distance between the ego vehicle and the VOS and a lateral distance between the VOS and a current lane of the ego vehicle. In the example embodiments, the lateral distance refers to a distance between a vehicle parked on a shoulder of the road and a current lane of an ego vehicle. The margin that separates the lane from the closest corner of the vehicle on the shoulder may be used, or some other method.

In some embodiments, the method may further include controlling the ego vehicle to perform the lane change to the lane further removed from the shoulder when the lateral distance between the VOS and the current lane of the ego vehicle is less than a predetermined distance. In some embodiments, the method may further include controlling the ego vehicle to stay in the current lane when the lateral distance between the VOS and the current lane of the ego vehicle is greater than a predetermined distance and there is no traffic in the lane further removed from the shoulder. In some embodiments, the determining whether to perform the lane change to the lane further removed from the shoulder may further be performed based on one or more of a lane preference cost function, a speed limit cost function, an end-of-route cost function, and an impatience cost function. In some embodiments, the determining whether to perform the lane change to the lane further removed from shoulder may further be performed based on two or more of the lane preference cost function, the speed limit cost function, the end-of-route cost function, and the impatience cost function.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. An apparatus comprising:
   a memory; and
   a processor configured to
   detect a vehicle on a shoulder (VOS) of a road based on sensor data sensed by one or more sensors of an ego vehicle approaching the VOS,
   identify a lateral distance and a longitudinal distance between the VOS and the ego vehicle,
   determine to slow down the ego vehicle based on a comparison of the identified longitudinal distance between the VOS and the ego vehicle to a first threshold distance and simultaneously determine whether or not to perform a lane change to a lane further removed from the shoulder based on a comparison of the identified lateral distance between the VOS and the ego vehicle to a second threshold distance, and
   control the ego vehicle based on the determinations.

2. The apparatus of claim 1, wherein the processor is configured to control the ego vehicle to slow down to at least a predefined minimum speed at least a predetermined longitudinal distance before the ego vehicle is adjacent to the VOS.

3. The apparatus of claim 2, wherein the processor is configured to hold the ego vehicle at or below the predefined minimum speed while the ego vehicle passes the VOS until at least a second predetermined longitudinal distance after the VOS, and control the ego vehicle to accelerate to a predefined maximum speed.

4. The apparatus of claim 1, wherein the processor is further configured to determine whether to perform the lane change to the lane further removed from the shoulder based on the longitudinal distance between the ego vehicle and the VOS.

5. The apparatus of claim 1, wherein the processor is further configured to control the ego vehicle to perform the lane change to the lane further removed from the shoulder when the lateral distance between the VOS and the current lane of the ego vehicle is less than the second threshold distance.

6. The apparatus of claim 1, wherein the processor is further configured to control the ego vehicle to stay in the current lane when the lateral distance between the VOS and the current lane of the ego vehicle is greater than the second threshold distance and there is no traffic in the lane further removed from the shoulder.

7. The apparatus of claim 1, wherein the processor is further configured to determine whether to perform the lane change to the lane further removed from the shoulder based on one or more of a lane preference cost function, a speed limit cost function, an end-of-route cost function, and an impatience cost function.

8. The apparatus of claim 7, wherein the processor is further configured to determine whether to perform the lane change to the lane further removed from the shoulder based on two or more of the lane preference cost function, the speed limit cost function, the end-of-route cost function, and the impatience cost function.

9. A method comprising:
   detecting a vehicle on a shoulder (VOS) of a road based on sensor data sensed by one or more sensors of an ego vehicle approaching the VOS;
   identifying a lateral distance and a longitudinal distance between the VOS and the ego vehicle;
   determining whether to slow down the ego vehicle based on a comparison of the identified longitudinal distance between the VOS and the ego vehicle to a first threshold distance and simultaneously determining whether or not to perform a lane change to a lane further removed from the shoulder based on the identified lateral distance between the VOS and the ego vehicle to a second threshold distance; and
   controlling the ego vehicle based on the determinations.

10. The method of claim 9, wherein the controlling comprises controlling the ego vehicle to slow down to at least a predefined minimum speed until at least a predetermined longitudinal distance before the ego vehicle is adjacent to the VOS.

11. The method of claim 10, wherein the controlling comprises holding the ego vehicle at or below the predefined minimum speed while the ego vehicle passes the VOS until at least a second predetermined longitudinal distance after the VOS, and controlling the ego vehicle to accelerate to a predefined maximum speed.

12. The method of claim 9, wherein the method further comprises determining whether to perform a lane change to the lane further removed from the shoulder based on the longitudinal distance between the ego vehicle and the VOS.

13. The method of claim 12, wherein the method further comprises controlling the ego vehicle to perform the lane change to the lane further removed from the shoulder when the lateral distance between the VOS and the current lane of the ego vehicle is less than the second threshold distance.

14. The method of claim 12, wherein the method further comprises controlling the ego vehicle to stay in the current lane when the lateral distance between the VOS and the current lane of the ego vehicle is greater than the second threshold distance and there is no traffic in the lane further removed from the shoulder.

15. The method of claim 12, wherein the determining whether to perform the lane change to the lane further removed from the shoulder is further performed based on one or more of a lane preference cost function, a speed limit cost function, an end-of-route cost function, and an impatience cost function.

16. The method of claim 15, wherein the determining whether to perform the lane change to the lane further removed from the shoulder is further performed based on two or more of the lane preference cost function, the speed limit cost function, the end-of-route cost function, and the impatience cost function.

17. A non-transitory computer-readable medium comprising instructions which when executed by a processor cause a computer to perform a method comprising:
  detecting a vehicle on a shoulder (VOS) of a road based on sensor data sensed by one or more sensors of an ego vehicle approaching the VOS;
  identifying a lateral distance and a longitudinal distance between the VOS and the ego vehicle;
  determining whether to slow down the ego vehicle based on a comparison of the identified longitudinal distance between the VOS and the ego vehicle to a first threshold distance and simultaneously determining whether or not to perform a lane change to a lane further removed from the shoulder based on a comparison of the identified lateral distance between the VOS and the ego vehicle to a second threshold distance; and
  controlling the ego vehicle based on the determinations.

18. The non-transitory computer-readable medium of claim 17, wherein the controlling further comprises controlling the ego vehicle to slow down to at least a predefined minimum speed at least a predetermined longitudinal distance before the ego vehicle is adjacent to the VOS.

19. The non-transitory computer-readable medium of claim 18, wherein the controlling further comprises holding the ego vehicle at or below the predefined minimum speed while the ego vehicle passes the VOS until at least a predetermined longitudinal distance after the VOS, and controlling the ego vehicle to accelerate to a predefined maximum speed.

20. The non-transitory computer-readable medium of claim 17, wherein the determining further comprises determining whether to perform the lane change to the lane further removed from the shoulder based on the longitudinal distance between the ego vehicle and the VOS.

* * * * *